United States Patent Office 3,740,414
Patented June 19, 1973

3,740,414
COMPOSITION OF MATTER
Melvin M. Olson, Richfield, Minn., assignor to Minnesota Mining and Manufacturing Company, St. Paul, Minn.
No Drawing. Division of application Ser. No. 43,970, June 5, 1970, now Patent No. 3,661,874, which is a continuation-in-part of application Ser. No. 871,529, Nov. 6, 1969, which in turn is a continuation-in-part of application Ser. No. 469,902, July 6, 1965, both now abandoned. This application Jan. 17, 1972, Ser. No. 218,581
Int. Cl. C08c 11/44; C08d 5/02, 9/00
U.S. Cl. 260—326 A                                16 Claims

ABSTRACT OF THE DISCLOSURE

A water-soluble rubbery polymer, formed by the reaction of an epoxidized water-insoluble neutral rubbery polymer and a water-soluble secondary mono amine, has particular utility in the formulation of water-soluble pressure-sensitive adhesives and coatings which render hydrophobic substrates hydrophilic.

CROSS-REFERENCES TO RELATED APPLICATIONS

This application is a division of copending U.S. patent application Ser. No. 43,970, filed June 5, 1970, now U.S. Pat. No. 3,661,874, which application was a continuation-in-part of Ser. No. 871,529, filed Nov. 6, 1969 and now abandoned, which was, in turn, a continuation of Ser. No. 469,902, filed July 6, 1965, now abandoned.

BACKGROUND OF THE INVENTION

This invention relates to novel water-soluble rubbery polymers and to compositions and products made therewith.

There has long been a commercial appetite for compositions to prime normally hydrophobic surfaces and render them hydrophilic. By and large, rubbery polymers adhere well to hydrophobic surfaces, but they, too, are hydrophobic and hence not especially receptive to water-soluble or hydrophilic coatings.

Definition of terms

As used herein "rubbery" means possessing those physical parameters (exclusive of solubility) which are used to define a rubber as set out in ASTM Standard D 1566-62T. The appropriate part of the definition given therein for "rubber" reads as follows:

"A material that is capable of recovery from large deformations quickly and forcibly . . . . A rubber . . . retracts within one minute to less than 1.5 times its original length after being stretched at room temperature (20–27° C.) to twice its length and held for one minute before release." All of the water-soluble rubbery polymers of this invention meet this criterion.

As used herein, "water-soluble" means requiring 10–30 parts of water to dissolve one part of solute; cf. Hackh's Chemical Dictionary, 3rd edition, McGraw-Hill (1944).

SUMMARY

The present invention provides novel hydrophilic rubbery polymers which adhere firmly to both hydrophilic and hydrophobic surfaces. These polymers, which are actually water-soluble, can also be compounded with tackifiers and used in the manufacture of water-soluble normally tacky and pressure-sensitive adhesives and other compositions having unique and valuable properties.

In accordance with the present invention, water-insoluble neutral rubbery polymers are rendered water-soluble by a comparatively simple two-step reaction in which a significant number of the double bonds in the rubbery material are converted to epoxy groups, and the epoxy groups thereafter reacted with secondary amine molecules to provide a rubbery polymer characterized by the presence of tertiary amino groups and hydroxyl groups. The resultant polymer is water-soluble, alkaline in aqueous solution, tough and leathery when dry, and still maintains a significant degree of elasticity. Interestingly, whereas the original rubbery polymers are soluble in a wide variety of organic solvents (e.g., methylene chloride, dioxane, toluene, benzene, and heptane), the modified water-soluble polymer is essentially insoluble in most organic solvents. A preferred rubbery polymer for use in preparing materials in accordance with the present invention is cis-1,4-polybutadiene, the double bonds in this polymer being especially susceptible to epoxidation. Other polymers are useful, however, as will be shown.

That organic solvent-soluble, water-insoluble rubbery polymers can be made water-soluble and nonpolar solvent-insoluble, without detracting from their high molecular weight, while still maintaining their rubbery characteristics to a significant degree, is surprising. Thus, although natural rubber has been wholly or partially epoxidized and then cross-linked with primary amines, the resultant product is less rubbery, and even more water-insoluble that it was before. Secondary amines, of course, are not useful for this crosslinking reaction. Others have also reacted 2-methyl-2, 3-epoxy pentane, a model for natural rubber epoxide, with both primary and secondary amines, but there has been no suggestion that the reaction product is water-soluble, let alone that rubber itself could be rendered water-soluble by epoxidation and reaction to an appropriate extent with selected secondary amines.

Speaking in general terms, the more double bonds which are epoxidized, the greater the loss in rubbery characteristics sustained by the polymer. Accordingly, it is generally preferred not to convert all unsaturation to epoxy rings. The requisite degree of epoxidation to obtain water-solubility is dependent upon both the specific rubbery polymer and the specific amine employed. Where the rubbery polymer is cis-1,4-polybutadiene, the maximum epoxy equivalent (i.e., molecular weight per epoxy ring) to achieve water-solubility in a subsequent reaction with a secondary amine varies with the water solubility, stearic hindrance, etc. of such secondary amines. For example, where the rubbery polymer is cis-1,4-polybutadiene and the secondary amine is morpholine, the maximum epoxy equivalent (grams of polymer per epoxy gram equivalent) has been found to be approximately 160. Where the secondary amine is dimethyl amine, the maximum epoxy equivalent for achieving water solubility has been found to be approximately 210. It appears that roughly the same figures apply when rubbery butadiene:styrene copolymers or rubbery butadiene:acrylonitrile copolymers are substituted for polybutadiene. When dimethylamine is used with polyisoprene, however, the maximum epoxy equivalent approaches 225.

Although a large number of secondary amines show utility in rendering epoxidized rubbery materials water-soluble, several general principles of selection have proved significant. For example, the greater the water-solubility of the amine, the more effective it is in rendering epoxidized rubbery polymers water-soluble; hence, infinitely water-soluble amines are generally preferred. Likewise, the less sterically hindered the amino nitrogen, the more readily it reacts with an epoxy ring. For example, the presence of side chains or ring units on the carbon atom adjacent the amino nitrogen is a great deterrent to the reaction. In the absence of steric hindrance, lower molecular weight secondary amines tend to promote water-solubility more effectively than higher molecular weight secondary amines, the reaction with epoxy rings occurring more rapidly, and the requisite degree of epoxidation of the rubbery polymer being lower. The more effective the secondary amine is in promoting water-solubility, the less the degree of epoxidation required.

Among the secondary amines which have been found effective in rendering epoxidized rubbery polymers water soluble are dimethylamine, diethylamine, diethanolamine, di-n-propylamine, di-n-butylamine, di-n-pentylamine, methylbenzylamine, methyl cyclohexylamine, diallylamine, N-methylbenzylamine, N-methylcyclohexylamine, 2-ethylaminoethanol, morpholine, 2,6-dimethyl morpholine, piperidine, 1-methyl piperazine, and pyrrolidine. It will be noted, that the foregoing list includes both saturated and unsaturated straight chain aliphatic compounds, cycloaliphatic compounds, 5- and 6-member heterocyclic compounds, and secondary amines in which two different types of substituent are attached to the amino nitrogen. Mixtures of secondary amines may also be employed to take advantage of their individual properties. Presence of certain groups in the vicinity of the amino nitrogen apparently inhibits or even prevents, the reaction with epoxy groups. For example, either the direct attachment of a benzene ring to the nitrogen atom, or branching of an aliphatic substituent within two carbon atoms of the amino nitrogen seems to prevent reaction with an epoxide ring. Thus, N-methyl aniline, diisopropylamine, and diisobutylamine all perform more poorly than might be suspected. It is noted that where the amino nitrogen is included in a heterocyclic ring, there appears to be essentially no problem of steric hindrance.

As previously indicated, water solubility of the finished product is affected both by the nature of the secondary amine and the degree to which it reacts with the epoxidized rubbery polymer. Where the polymer is cis-1,4-polybutadiene, and where the secondary amine is morpholine, water solubility occurs when 1% or more nitrogen is introduced into the polymer. Where the polymer is polyisoprene and the amine is dimethylamine, water solubility occurs with relatively extended agitation when only 0.5% nitrogen is present in the polymer. Due to the extended reaction times necessary to both epoxidize and aminize polyisoprene, the use of this rubber is not favored. Preferably, however, at least about 2 to 3% nitrogen is introduced into the polymer, thereby producing a polymer which is extremely useful in the manufacture of water-soluble normally tacky and pressure-sensitive adhesives. The percent nitrogen necessary to achieve water solubility varies with the specific amine employed; e.g., it will be somewhat lower for dimethylamine and somewhat higher for di-n-butylamine.

DESCRIPTION OF PREFERRED EMBODIMENTS

The invention will be better understood by reference to the following specific examples, which are presented solely for the purpose of illustration.

EXAMPLE 1

Epoxidation of cis-1,4-polybutadiene

In a 1-liter, three-neck round bottom flask equipped with stirrer, dropping funnel, thermometer, nitrogen inlet, and reflux condenser, was placed 540 grams (0.5 mol of double bond) of a 5% solution of 1,4-polybutadiene in toluene. The polybutadiene contained approximately 98% cis configuration and had a Mooney viscosity (ML-4 at 212° F.) of about 41. This polymer, as available commercially from Goodrich-Gulf Chemicals Incorporated, Cleveland, Ohio, under the trade designation "Ameripol" CB-220, contains approximately 1% 2,6-ditertiary butyl p-cresol stabilizer. Into the flask was also placed 6.0 grams of acidic ion-exchange resin (available commercially from the Dow Chemical Company under the trade designation as "Dowex 50W-X12") which had been leached with acetic acid and dried with suction on a sintered glass filter, the acetic acid content of the thus-dried resin being 17.6%. To the flask was then added 15.4 grams of glacial acetic acid, making the total amount of acetic acid present 0.2738 mol. The mixture was continuously stirred and heated at 60° C. for 50 minutes, during which time 37.4 grams (0.55 mol) of 50% hydrogen peroxide was slowly added. Heating and stirring were then continued for an additional 5 hours, at the end of which time the rubber precipitated. The toluene was then poured off and sufficient 1,4-dioxane added to dissolve the rubber. The rubber was again precipitated by adding the solution to methyl alcohol, after which it was re-dissolved in methylene chloride to give an 8.73% solids solution. The epoxy equivalent, on a solids basis, was found to be 137.6 grams per epoxy equivalent, following the procedure outlined by Durbetaki in Analytical Chemistry, volume 28 (1956), page 2000.

Epoxidation may, of course, be carried out in a variety of other ways. For example, the ion exchange resin catalyst and the acetic acid may both be replaced with formic acid, the time required for reaction being reduced to approximately 80 minutes, and the reaction temperature required being 21–24° C. Similarly, the polybutadiene may be dissolved in 1,4-dioxane and the hydrogen peroxide replaced with peracetic acid, employing a somewhat longer reaction time. More complete epoxidation may be obtained by using perphthalic acid, but this oxidizing agent is quite expensive, and hence less attractive commercially.

Conversion of epoxidized rubbery polymer to water-soluble polymer

In a 500 ml., three-neck, round-bottomed flask equipped with stirrer, reflux condenser and nitrogen inlet was placed 248.5 grams of a 7.86% solution of epoxidized cis-1,4-polybutadiene in 1,4 dioxane, the epoxy equivalent of the rubber being 112.8 grams per epoxy group (i.e., 56.4% of the theoretical number of double bonds epoxidized). Next was added 15.2 grams (0.174 mol) of morpholine and 1.63 grams (0.0174 mol) of phenol.

It is well known that the amination of oxirane rings can be accelerated by weak hydrogen donors which serve as catalysts. Phenyl and similar low molecular weight monohydric alcohols as well as water perform this function. While phenol is generally more active than water, the latter is preferred because it is more easily removed after the reaction is complete.

The mixture was stirred and heated on a steam bath for about 18 hours. The reaction mixture was then poured slowly into a large volume of benzene in order to precipitate the polymer. The precipitate was purified by dissolving it in methyl alcohol, re-precipitating in benzene, and re-dissolving in methyl alcohol. A water solution of the polymer could be obtained by adding the methyl alcohol solution to water and boiling the solution to remove the methyl alcohol and trace amounts of benzene present, yielding a clear water solution. Analysis of the polymer for percent nitrogen gave a value of 2.63 based on solid polymer, representing the reaction of 25.4% of the available epoxy groups with morpholine, or conversion of 14.1% of the original

linkages to

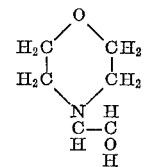

Use of water-soluble rubbery polymer as primer

A conventional normally tacky and pressure-sensitive adhesive tape, in which the adhesive was coated over the aluminum vapor-deposited surface of a 1-mil polyester film and protected with a removable liner, was backsized with 6 grains (solids basis) per 24 square inches of a 10–12% methyl alcohol solution of the water-soluble polymer in the preceding section of this example. (Although the polymer is miscible with water in all proportions, aqueous solutions tend to be more viscous. Additionally, more volatile solvents permit faster drying.) After evaporation of the solvent, the resulting thin coating displayed excellent adhesion to the polyester film surface, in marked contrast to most water-soluble materials. This product was used as a splicing tape in the manufacture of photographic film, the aqueous photographic emulsion displaying excellent adhesion to the thus-primed surface. In the absence of such a coating, it is found that the photographic emulsion tends to flake off during drying and contaminate the film in surrounding areas. The backsize was essentially tack-free, although it displayed some adhesion for a slightly moist finger.

Preparation of water-soluble normally tacky and pressure-sensitive adhesive

A 26.9% methyl alcohol solution of the epoxidized cis-1,4-polybutadiene:morpholine reaction product described in a preceding section of this example, was blended with an equal weight (solids basis) of N,N,N',N'-tetrakis (2-hydroxy propyl) ethylene diamine available commercially as "Quadrol" from the Wyandotte Chemical Company. When knife coated on a 0.003 inch film of biaxially oriented polyethylene terephthalate, using an aperture of 0.011 inch above the film, and the solvent then evaporated, the dried adhesive displayed very high "web grab," or initial adhesiveness. The room temperature adhesiveness was also measured on a "Polyken" ProbeTack Tester by forcing the end of a stainless steel rod, having a diameter of 5 mm. with an 0.002-inch crown and a surface finish of 5 microinches, against the surface of the adhesive at a rate of 1 cm./sec. and a pressure of 100 gms./cm.$^2$. After a dwell time of ½ second, the force required to remove the rod at a rate of 1 cm./sec. was measured and found to be 533 grams, which is roughly twice as great as that for conventional transparent pressure-sensitive adhesive tape, and about five times as high as for any previously known water-soluble pressure-sensitive adhesive.

The internal strength of the adhesive was measured by placing two-one-half inch strips of the tape in face-to-face relationship so that they overlapped each other by one-half inch, resulting in a mutual adhesive contact area of one-half inch by one-half inch. The overlapped strips were then pressed together with a weighted roll and tensioned by the application of a force of 1000 grams applied between the free ends of the two strips. The time for the face-to-face bond to fail by sliding apart was found to be 7.3 minutes. A shear time of 5 minutes is considered adequate for most uses to which transparent tape adhesives are subjected, and even lower values may be satisfactory where the tape is not to be subjected to stress in use. Where the tape will be subjected to tensile stresses, as in packaging operations, it is more important to have high internal strength, and times of 30 minutes or higher before failure are considered desirable.

Double-coated tape made by coating both surfaces of 8-lb. "Crystex" tissue with a solution of this adhesive displayed excellent adhesion to almost all surfaces. Because of the adhesive's excellent adhesion and water solubility, tapes of this type offer excellent potential for use as a repulpable splicing tape in paper mills, perhaps even for making high speed, or "flying," splices. A 1¼-inch square piece of this tape was placed between the overlapped ends of two 40-lb. kraft paper strips, rolled once in each direction with a 4½-lb. rubber roller, and allowed to stand for 5 to 10 minutes. When the two ends of the paper were then clamped, respectively, in the upper and lower jaws of a tensile tester, the force required to shear the bond measured at a jaw separation rate of 12 inches per minute was found to be 3.2 lbs. Increasing the nitrogen content of the rubbery polymer tends to decrease its tackiness but increase its shear strength.

The "Quadrol" in the composition just described functions as a water-soluble tackifier and plasticizer for the water-soluble modified rubber. Generally speaking, the tackiness of the adhesive is directly related, and the internal strength inversely related to the amount of tackifier present. Other tackifiers which may be employed include polyoxyethylene glycol having a molecular weight of 400, polyoxyethylene glycol monophenyl ether, dodecyl aniline, p-n-butoxy phenol, and dodecyl phenol. Other plasticizers and tackifiers such as triethanolamine may be employed. Similarly, antioxidants such as 2,6-di-tert-amyl-phenol may be included in the adhesive.

Tabulated below are examples showing the effect of varying the epoxy equivalent of the modified rubbery cis-1,4-polybutadiene, the secondary amine employed, and the conditions under which the amine and epoxidized rubbery polymer are reacted. All polymers are water-soluble. Where normally tacky and pressure-sensitive adhesives were made from the polymers by blending equal weights of water-soluble polymer and "Quadrol," tackiness and internal strength of the adhesives tested as described in the preceding example, are also listed.

EPOXIDIZED RUBBER:AMINE REACTION

| Ex. | Epoxy equiv-alent | Amine | Mol ratio, epoxy: amine | Solvent | Mol ratio, phenol: amine | Water, percent wt. of solution | Temp., °C. | Reaction time, hrs. | Finished product adhesive, percent N | Tackiness, grams | Internal strength, minutes |
|---|---|---|---|---|---|---|---|---|---|---|---|
| 2 | 110.5 | Morpholine | 0.67 | Dioxane | 0.1 | 20 | 95 | 16 | 1.18 | | |
| 3 | 120.8 | do | 1.0 | do | 0.1 | 10 | 95 | 16 | 1.37 | | |
| 4 | 134.2 | do | 1.0 | do | 0.1 | 0.12 | 88 | 90 | 1.42 | 167 | 33.6 |
| 5 | 134.2 | do | 1.0 | do | 0.1 | 10 | 95 | 26 | | | |
| 6 | 134.9 | do | 0.67 | do | 0.1 | 10 | 95 | 16 | 2.04 | | |
| 7 | 141 | do | 0.67 | MEK | 0.1 | 10 | 95 | 16 | 1.46 | | |
| 8 | 154.8 | do | 1.0 | Dioxane | 0.1 | 10 | 95 | 46 | | 233 | 8.6 |
| 9 | 114.7 | Dimethylamine | 1.0 | do | 0.1 | 8.48 | 90 | 24 | 2.01 | 625 | 5.5 |
| 10 | 134.2 | do | 1.0 | do | 0.1 | 0.12 | 88 | 24 | 1.54 | 130 | 3.2 |
| 11 | 114.7 | Diethylamine | 1.0 | do | 0.1 | 8.48 | 90 | 24 | 1.10 | 432 | 5.2 |
| 12 | 117.3 | Di-n-propylamine | 1.0 | do | 0.1 | 10 | 88 | 40 | | 212 | 2.3 |
| 13 | 120 | Di-n-butylamine | 1.0 | do | 0.1 | 10 | 90 | 90 | 1.27 | 662 | 1.5 |
| 14 | 120 | Diethanolamine | 1.0 | do | 0.1 | 10 | 90 | 90 | 2.44 | 208 | 0.1 |
| 15 | 123.5 | N-methylbenzylamine | 1.0 | do | 0.1 | 10 | 88 | 70 | | 0 | 0.8 |
| 16 | 120 | Piperidine | 1.0 | do | 0.1 | 10 | 80 | 20 | 3.3 | 733 | 2.3 |

EXAMPLE 17

A rubbery 76.5:23.5 butadiene:styrene copolymer, having a Mooney viscosity (ML-4 at 212° F.) of 50–58, available from Shell Chemical Company, under the trade designation "GR-S Type 1011 Synthetic Rubber," was epoxidized in the same manner as described in Example 1, the ultimate epoxy equivalent obtained being 186.1, representing a conversion of approximately 41.5% of the double bonds to epoxy groups. The raw rubbery copolymer is somewhat harder to epoxidize to the same degree as cis-1,4-polybutadiene. The epoxidized rubber, although less elastic than the original polymer, was still tough and, when stretched, slowly returned to its original length. Following the same general procedure outlined in Example 1 (except for the use of 10% water in the catalyst system and the substitution of dimethylamine for the morpholine), the epoxidized rubbery copolymer was reacted with dimethylamine to obtain a water-soluble rubbery copolymer. When blended with an equal weight of "Quadrol," the resultant normally tacky and pressure-sensitive adhesive had a tackiness value of 158 and an internal strength of 69.9, when tested as described in Example 1, making it useful as an adhesive for packaging tape.

EXAMPLE 18

A rubbery 80:20 butadiene:acrylonitrile copolymer, having a Mooney viscosity (ML-4 at 212° F.) of 80, available from Goodrich Chemical Company under the trade designation "Hycar" 1014, was epoxidized in the same manner as in Example 17 to an epoxy equivalent of 209.1, representing a conversion of approximately 35% of the double bonds in the original polymer. The raw butadiene:acrylonitrile copolymer is even harder to epoxidize than the butadiene:styrene copolymer. Although less elastic than the unmodified polymer, the epoxidized product was still tough and fairly elastic. The epoxidized polymer was then made water-soluble by reacting it with dimethylamine, as in Example 2. When blended with an equal weight of "Quadrol," the resultant normally tacky and pressure-sensitive adhesive had a tackiness value of 190 and an internal strength of 33.2 when tested as in Example 1. The presence of the polar $O_H$ group is believed to enhance affinity of the adhesive for metal surfaces.

EXAMPLE 19

Cis-1,4-polyisoprene (which has basically the same molecular structure as natural rubber), having a Mooney viscosity (ML-4 at 212° F.) of 75–95, available commercially from Goodyear Tire & Rubber Company under the trade designation "Natsyn" polyisoprene rubber is epoxidized to an epoxy equivalent of 180 and rendered water-soluble by reaction with dimethylamine. The water-soluble polymer may be employed as a primer for hydrophobic substrates or compounded into an adhesive, as in preceding examples.

EXAMPLES 20–25

These examples illustrate the rubbery characteristics of the water-soluble polymers of this invention and clearly indicate, by comparison of these characteristics with the characteristics of the rubbers before treatment, the similarity in properties. The procedure for making products of these examples is generally like those used in the preceding examples with the conditions indicated in the table below, 1,4-dioxane being used as the solvent for epoxidized rubber in all cases. It should be noted that while the polyisoprene derivative is soluble, it required a relatively extended period of agitation to dissolve completely and form an aqueous solution.

REACTION CONDITIONS FOR EXAMPLES 20-25

| | | | Moles of epoxidation reactants | | Reaction conditions epoxidation | | | |
|---|---|---|---|---|---|---|---|---|
| Ex. | Rubber | Amine | Epoxidizing agent | Double bond | Time | Temp., °C. | Solvent | Epoxy, equiv. wt. |
| 20 | Cis-1,4-polybutadiene | Dimethyl amine. | Formic acid plus Hydrogen peroxide | 0.285 / 2.19 | 1.83 | 5 hrs., 8 min. plus 1 hr., 27 min. | 65–67 | Toluene | 131 |
| 21 | do | Morpholine | Same as above | 2.19 | 1.83 | do | 65–67 | do | 124 |
| 22 | do | Piperidine | do | 2.19 | 1.83 | do | 65–71 | do | 131 |
| 23 | Cis-1,4 polyisoprene ("Ameripol" SN 600, Mooney viscosity 75–90). | Dimethyl amine. | Peracetic acid plus 4.85 g. anhydrous NaAc. | 0.936 | 0.936 | 2 hrs., 40 min. plus 3 hrs., 49 min.[1] | 6–22 | do | 223 |
| 24 | Butadiene:styrene(GR-S Type 1011). | do | Peracetic acid plus 2.68 g. anhydrous NaAc. | 0.527 | 0.5 | 17 hrs. plus 2 hrs., 35 min. | 5–22 | Methylene chloride. | 200 |
| 25 | Butadiene:acrylonitrile ("Hycar" 1014). | do | Peracetic acid plus 2.5 g. anhydrous NaAc. | 0.5 | 0.5 | 6 hrs. plus 30 min. | 9–30 | do | 183 |

| | Moles of amination reactants | | Reaction conditions-amination | | Moles added | | Finish product | | Percent conversion of epoxy to amine |
|---|---|---|---|---|---|---|---|---|---|
| Example | Epoxy group | Amine | Time | Temp., °C. | H₂O | Phenol | N, equiv. wt. | Percent N | |
| 20 | 0.2 | 1.0 | 19 hrs | 59–63 | 1.3 | 0.0 | 425 | 3.29 | 34.5 |
| 21 | 0.2 | 0.4 | 16 hrs., 10 min | 84 | 2.1 | 0.02 | 522 | 2.68 | 28.6 |
| 22 | 0.2 | 0.4 | 3 hrs., 40 min | 68–78 | 1.6 | 0.0 | 482 | 2.91 | 33.0 |
| 23 | 0.24 | 1.2 plus 1.2 | 21 hrs., 40 min. plus 66 hrs.[2] | 63 | 0.0 | 0.0 | 2640 | 0.53 | 8.6 |
| 24 | 0.12 | 0.6 | 19 hrs | 71 | 2.1 | 0.0 | 1006 | 1.39 | 20.8 |
| 25 | 0.2 | 1.0 plus 1.0 | 16 hrs.[3] plus 6.5 hrs | 67–69 | 3.4 | 0.0 | 922 | 1.52 | 20.9 |

[1] 600 ml. of methylene chloride was added to redissolve epoxidized polymer which precipitated after addition of all peracetic acid.
[2] 1.2 moles of dimethylamine was added to the mixture after 21 hours, 40 minutes; then heating was continued for 66 hours.
[3] 172 ml. of methanol was added to dissolve the polymer after 16 hours, at which time another 1.0 mole of amine was added.

The water-soluble polymers were prepared for testing by spin casting from a methyl alcohol solution of the polymer, using a nitrogen sweep to speed drying and minimize oxidative attack. Since these polymers are affected by humidity, the tests were performed in controlled humidity chambers. (The starting rubbers are not so affected and hence were tested in ambient humidity conditions.) The testing procedure followed that given in ASTM Test Procedure D412–64T using an "Instron" tester except that thickness measurements used to determine tensile strength were taken at 5 points rather than 3 of the bar portions of the dumbbell-shaped samples. The thickness measurement closest to the break point was used rather than an average thickness as indicated in the ASTM procedure. The tables below provide a comparison between the base rubbers and their water-soluble counterparts.

PHYSICAL PROPERTIES OF BASE RUBBERS

| Rubber | Tensile strength in p.s.i. at various elongations | | | Percent elongation at break | Percent set at break | Remarks |
|---|---|---|---|---|---|---|
| | 150% | 300% | Break | | | |
| "Ameripol" CB 220 (compare with Ex. 20–22) | 15.6 | 12.4 | 5.86 | 1,406 | 175 | Break occurred. |
| "Ameripol" SN 600 (compare with Ex. 23) | 44.3 | 37.7 | 33.7 | 1,346 | 312 | Do. |
| GR-S Type 1011 (compare with Ex. 24) | 31.1 | 28.9 | 30.9 | 1,833 | 258 | No break occurred at maximum "Instron" setting. |
| "Hycar" 1014 (compare with Ex. 25) | 51.4 | 44.7 | 41.7 | 1,738 | 168 | Do. |

PHYSICAL PROPERTIES OF WATER-SOLUBLE RUBBERS

| Ex. | Relative humidity | Tensile strength in p.s.i. at various elongations | | | Percent elongation at break | Percent set at break | Remarks |
|---|---|---|---|---|---|---|---|
| | | 150% | 300% | Break | | | |
| 20 | 35 | 137 | 171 | 366 | 692 | 5.4 | Break. |
| | 50 | 82 | 89.7 | 167 | 1,042 | 26.5 | Do. |
| 21 | 38 | 57.6 | 65.8 | 101 | 1,366 | 43.7 | Do. |
| | 55 | 44.3 | 45.3 | 61.1 | 942 | 35.4 | Do. |
| 22 | 35 | 94.6 | 102 | 137 | 1,308 | 53.6 | Do. |
| | 50 | 63.7 | 60.9 | | >1,800 | | No break at maximum "Instron" setting. |
| 23 | 35 | 127 | 189 | 867 | 687 | 3.1 | Break. |
| | 50 | 107 | 147 | 622 | 666 | 4.6 | Do. |
| 24 | 35 | 1,270 | 1,710 | 1,745 | 325 | 22.6 | Do. |
| | 50 | 135 | 189 | 290 | 567 | 10.9 | Do. |
| 25 | 33 | 36.4 | 40.5 | 114.2 | 1,450 | 181 | No break values given at maximum "Instron" extension. |
| | 25.8 | 25.8 | 27.9 | 60.2 | 1,517 | 204 | Break. |

The man skilled in the art will recognize that it is not feasible to set forth all the variations to which this invention is susceptible, and many modifications will readily suggest themselves. For example, the higher the molecular weight of the rubbery polymer, the greater the number of tertiary amino groups required to induce an equivalent degree of water-solubility. Likewise, the water-solubilizing ability of a given secondary amine is enhanced if the amine compound also contains OH or other polar groups. Where it is desired to have a polymer which is water-soluble but which can be cross-linked to an insoluble state, it is possible to introduce compounds which react with either two or more epoxy rings or two or more hydroxyl groups under the stimulus of, e.g., heat. For example, dihalogen compounds such as ethylene dichloride, dichloromethyl ether, and $\alpha,\omega$-dichloropolyoxyethylene may react with the tertiary amino groups, thereby forming water-soluble crosslinking salt bonds. The rate of crosslinking may be suitably controlled by selected dihalogen compounds having the desired degree of reactivity. Where desired, these compounds may be enclosed in capsules which rupture under a predetermined threshold stimulus of heat or pressure. Crosslinking may be similarly effected through the OH groups, using glyoxal or a formaldehyde donor such as hexamethylene tetramine. Such adhesive compositions lend themselves to the preparation of self-sustaining thermosetting pressure-sensitive adhesive transfer tapes (i.e., tacky but curable adhesive films provided with a removable liner), as well as strong but water-soluble crosslinked adhesives, such as for a repulpable splicing tape useful in paper mills.

Normally tacky and pressure-sensitive adhesives made with the water-soluble rubber polymers of the present invention display excellent adhesion to a wide variety of materials, and because such adhesives are also water-soluble, they stick tenaciously when applied but can be removed by soaking in water. Adhesives of this type may be employed in the preparation of water-activatable labels, thereby making their application simultaneously simple and effective. Because the modified rubbery polymers are essentially inert to most organic solvents, adhesives made with the polymers may be useful for attaching labels to fuel lines, hydraulic fluid lines, cooking oil containers, and the like. The hydrophilic nature of pressure-sensitive adhesives of the type described herein also reduces static electricity problems which plague the users of many conventional tape products and may eliminate the need for antistatic backsizes in most situations. The electrical conductivity of these adhesives also suggests their use for holding electrodes in place in electrocardiographic work. Both the conductivity and the bacteriostatic properties of the adhesive may be enhanced by reacting it with methyl bromide to form quaternary salts.

I claim:

1. A water-soluble normally tacky and pressure-sensitive adhesive comprising a homogeneous blend of (a) a water-soluble rubbery polymer, alkaline in aqueous solution, consisting essentially of the reaction product of an epoxidized water-insoluble neutral rubbery polymer selected from the class consisting of cis-1,4-polybutadiene, butadiene:styrene copolymer, butadiene:acrylonitrile copolymer and cis-1,4 - polyisoprene and a water-soluble secondary mono amine, with said epoxidized rubbery polymer having an epoxy equivalent of not greater than about 225, and (b) an effective amount of organic tackifying agent.

2. The adhesive of claim 1 wherein the neutral rubbery polymer is cis-1,4-polybutadiene.

3. The adhesive of claim 1 wherein the neutral rubbery polymer is a butadiene:styrene copolymer.

4. The adhesive of claim 1 wherein the neutral rubbery polymer is a butadiene:acrylonitrile copolymer.

5. The adhesive of claim 1 wherein the neutral rubbery polymer is cis-1,4-polyisoprene.

6. The adhesive of claim 1 wherein the secondary mono amine is morpholine.

7. The adhesive of claim 1 wherein the secondary monoamine is dimethyl amine.

8. The pressure-sensitive adhesive of claim 1 wherein the organic tackifying agent is N,N,N',N'-tetrakis (2-hydroxypropyl) ethylene diamine.

9. Normally tacky and pressure-sensitive adhesive tape comprising a flexible sheet backing having firmly bonded to at least one face thereof a layer of the normally tacky and pressure-sensitive adhesive of claim 1.

10. Normally tacky and pressure-sensitive adhesive tape comprising a flexible sheet backing having firmly bonded to at least one face thereof a layer of the normally tacky and pressure-sensitive adhesive of claim 2.

11. Normally tacky and pressure-sensitive adhesive tape comprising a flexible sheet backing having firmly bonded to at least one face thereof a layer of the normally tacky and pressure-sensitive adhesive of claim 3.

12. Normally tacky and pressure-sensitive adhesive tape comprising a flexible sheet backing having firmly bonded to at least one face thereof a layer of the normally tacky and pressure-sensitive adhesive of claim 4.

13. Normally tacky and pressure-sensitive adhesive tape comprising a flexible sheet backing having firmly bonded to at least one face thereof a layer of the normally tacky and pressure-sensitive adhesive of claim 5.

14. Normally tacky and pressure-sensitive adhesive tape comprising a flexible sheet backing having firmly bonded to at least one face thereof a layer of the normally tacky and pressure-sensitive adhesive of claim 6.

15. Normally tacky and pressure-sensitive adhesive tape comprising a flexible sheet backing having firmly bonded to at least one face thereof a layer of the normally tacky and pressure-sensitive adhesive of claim 7.

16. Normally tacky and pressure-sensitive adhesive tape comprising a flexible sheet backing having firmly bonded to at least one face thereof a layer of the normally tacky and pressure-sensitive adhesive of claim 8.

References Cited

UNITED STATES PATENTS 2,952,654 9/1960 Adams et al.
3,661,874 5/1972 Olson _____ 260—94.7 N X

FOREIGN PATENTS 646,607 8/1962 Canada.

OTHER REFERENCES

Technical Data Sheet on Quadrol, Wyandotte Chem. Co., 1959, pp. 1–6.

JOSEPH L. SCHOFER, Primary Examiner

W. F. HAMROCK, Assistant Examiner

U.S. Cl. X.R.

260—83.3, 85.1, 94.7 N, 122 PA; 117—122 P; 161—88